(12) United States Patent
Miranker (10) Patent No.: US 9,495,429 B2
(45) Date of Patent: Nov. 15, 2016

(54) AUTOMATIC SYNTHESIS AND PRESENTATION OF OLAP CUBES FROM SEMANTICALLY ENRICHED DATA SOURCES

(76) Inventor: Daniel Paul Miranker, Austin, TX (US)

(*) Notice: Subject to any disclaimer, the term of this patent is extended or adjusted under 35 U.S.C. 154(b) by 0 days.

(21) Appl. No.: 13/180,444

(22) Filed: Jul. 11, 2011

(65) Prior Publication Data

US 2012/0179644 A1 Jul. 12, 2012

Related U.S. Application Data

(60) Provisional application No. 61/362,781, filed on Jul. 9, 2010.

(51) Int. Cl.
*G06F 7/00* (2006.01)
*G06F 17/30* (2006.01)

(52) U.S. Cl.
CPC ... *G06F 17/30563* (2013.01); *G06F 17/30292* (2013.01); *G06F 17/30592* (2013.01)

(58) Field of Classification Search
CPC .................. G06F 17/30592; G06F 17/30563
USPC ................................................ 707/605, 812
See application file for complete search history.

(56) References Cited

U.S. PATENT DOCUMENTS

| | | | |
|---|---|---|---|
| 6,144,962 A * | 11/2000 | Weinberg et al. | |
| 6,768,986 B2 * | 7/2004 | Cras et al. | |
| 7,080,090 B2 * | 7/2006 | Shah et al. | 707/605 |
| 7,146,375 B2 * | 12/2006 | Egilsson et al. | 707/605 |
| 7,761,407 B1 * | 7/2010 | Stern | 707/602 |
| 7,856,416 B2 * | 12/2010 | Hoffman et al. | 707/605 |
| 7,953,695 B2 * | 5/2011 | Roller et al. | 707/605 |
| 8,099,382 B2 * | 1/2012 | Liu et al. | 707/601 |
| 8,170,981 B1 * | 5/2012 | Tewksbary | G06F 17/30557 707/600 |
| 2003/0120681 A1 * | 6/2003 | Baclawski | G06F 17/3066 |
| 2003/0208506 A1 * | 11/2003 | Greenfield et al. | 707/102 |
| 2005/0010550 A1 * | 1/2005 | Potter et al. | 707/1 |
| 2005/0010566 A1 * | 1/2005 | Cushing | G06F 17/30392 |
| 2005/0246357 A1 * | 11/2005 | Geary et al. | 707/100 |
| 2005/0278139 A1 * | 12/2005 | Glaenzer et al. | 702/179 |
| 2007/0027904 A1 * | 2/2007 | Chow et al. | 707/102 |
| 2007/0179760 A1 * | 8/2007 | Smith | 703/2 |
| 2007/0203933 A1 * | 8/2007 | Iversen et al. | 707/102 |
| 2008/0046427 A1 * | 2/2008 | Lee et al. | 707/6 |
| 2008/0091634 A1 * | 4/2008 | Seeman | 706/59 |
| 2008/0162550 A1 * | 7/2008 | Fey | 707/103 R |
| 2008/0162999 A1 * | 7/2008 | Schlueter et al. | 714/33 |
| 2008/0216060 A1 * | 9/2008 | Vargas | 717/137 |
| 2012/0102022 A1 * | 4/2012 | Miranker et al. | 707/713 |

OTHER PUBLICATIONS

Niinimäki et al., An ETL Process for OLAP Using RDF/OWL Ontologies, Journal on Data Semantics XIII, LNCS 5530, Springer, pp. 97-119.*

Buche et al., Flexible SPARQL Querying of Web Data Tables Driven by an Ontology, FQAS 2009, LNAI 5822, Springer, 2009, pp. 345-357.*

* cited by examiner

*Primary Examiner* — Hung T Vy (74) *Attorney, Agent, or Firm* — Sabety + associates, PLLC; Ted Sabety (57) ABSTRACT

This system comprises methods that simplify the creation of multidimensional OLAP models from one or more semantically enabled data sources. The system also comprises methods enabling interoperability between existing OLAP end-user interfaces, the system's representation of OLAP and the underlying data sources. This includes web-enabled OLAP interfaces.

31 Claims, 8 Drawing Sheets

Figure 1

Figure 2  UML Models Illustrating a Star Schema

Figure 3 UML Model Defining an Example Data Source

Figure 4 Developer Interface Showing Creation of a Star Ontology

Figure 5

1. PREFIX fact: <http://tibs.utexas.edu/ontology/starschema/fact#>
2. PREFIX location: <http://tibs.utexas.edu/ontology/starschema/location#>
3. SELECT ?sale
4. WHERE {
5.   ?fact fact:sale ?sale
6.   ?fact fact:location ?x .
7.   ?x location:state "TX".
8. }

6 (a)

1. PREFIX fact: <http://tibs.utexas.edu/ontology/starschema/fact#>
2. PREFIX location: <http://tibs.utexas.edu/ontology/starschema/location#>
3. PREFIX state: <http://tibs.utexas.edu/ontology/starschema/state#>
4. SELECT ?sale
5. WHERE {
6.   ?fact fact:sale ?sale
7.   ?fact fact:location ?l .
8.   ?l location:state ?x.
9.   ?x state:name "TX".
10. }

6 (b)

Figure 6: SPARQL Queries Representing Data Mapping

Figure 7 Graph Representation of Query Mapping

Figure 8 Graph Representation of the Ontology Mapping

AUTOMATIC SYNTHESIS AND PRESENTATION OF OLAP CUBES FROM SEMANTICALLY ENRICHED DATA SOURCES

PRIORITY CLAIM

This application claims priority as a non-provisional continuation of U.S. Provisional Patent Application No. 61/362,781 filed on Jul. 9, 2010 which is herein incorporated by reference in its entirety.

BACKGROUND OF THE INVENTION

Existing Internet Browsers present users formatted documents. Although there is enormous flexibility in the formatting of data as documents that may then be examined using an Internet browser, the owners of each Internet resource must determine, a priori, how data will be presented and develop an integrated system. Through emerging Semantic Web standards, conventional data sources, including, relational databases, flat files and excel spreadsheets, can have integral, automatic publication to the Internet in standardized representation. No user-facing formatting is required; whether the end user, or the developer. The resulting data and meta-data are easily input to computer programs.

The goals of Semantic Web technology include creating a structurally uniform representation of heterogeneous data, data models, and application domain models in a stack of computer languages, including at least RDF (resource description framework), RDFS, OWL (Web Ontology Language), and SPARQL also known as the Semantic Web stack. The Semantic Web as a computing process, architecture and form of organizing data has been described and implemented in various ways by the W3C (world wide web consortium), which is the industry group that maintains Internet protocol and data formatting standards. For more information on the semantic web, see "Semantic Web in Action", Scientific American, December 2007, Feigenbaum et. al., incorporated herein by reference, RDF is a graph representation of data. RDFS and OWL provide richer means to encode structure and domain models and logic. The entire system is object-oriented entailing an inheritance structure RDFS and OWL inheriting from RDF. The entire stack is well grounded to integrate knowledge-based, and logic-based solutions to data integration, mining and analysis problems.

The invention uses these technologies as a foundation to extend interactive browsing of the Internet to one or more arbitrary semantically enabled data sources. The purpose of the invention is to enable existing OLAP graphical user interfaces, (i.e., those interfaces capable of typical OLAP operations such as slice, dice, drill-down and roll-up) to support exploration and analysis of arbitrary data sources on the Internet.

The central component of an OLAP system is a logical, often materialized, multidimensional hierarchical organization of data; called a cube. Cubes have schema analogous to relational databases having schema. The creation of application specific OLAP schema is a highly skilled, labor-intensive activity.

Conventional OLAP interfaces interoperate with systems that comprise a manually generated OLAP schema, a highly skilled, labor-intensive activity. This invention automates much of this activity. This invention, further, takes an OLAP schema, an existing OLAP system and provides the means for the interoperation of the existing OLAP system with semantically enabled data sources.

In one embodiment, the invention involves creating a data structure representing a mapping from the ontological representation of an arbitrary relational schema to a ontology in the generic form of ontologies derived from star schema; and Storing the data structure on one or more memory storage devices.

In another embodiment, the invention involves determining the ontological representation of a first relational database; Receiving data representing a selection of attributes from the determined ontological representation and their correspondence to attributes of a pre-determined star schema ontology template in order to populate a specific instance of the star schema template; Storing the received data; and Initializing an OLAP definition of an MAP cube using the populated star schema template.

In yet another embodiment, the invention involves receiving a database query from an OLAP system; and translating the received query to a graph query language representation using a populated star schema template.

In yet another embodiment, the invention involves translating the graph query language representation to another query representation that corresponds to the first relational database schema using the ontological representation of the first relational database; and Submitting the translated corresponding query to the first relational database.

In yet another embodiment, the invention involves initializing an OLAP definition of an OLAP cube using a populated star schema template derived from a correspondence between ontological representation of a first relational database and the attributes of the star schema template.

DETAILED DESCRIPTION OF THE PREFERRED EMBODIMENTS

The invention provides a way of accessing data from a heterogeneous collection of data sources by means of manipulating an OLAP type user interface. This involves two aspects. First, there is the mapping of the one or more semantic hierarchies present in the heterogeneous collection of data sources to a hierarchical schema, for example a star schema. This mapping is typically performed by an application developer. The mapping itself is stored as a data structure to be used at run time. Another aspect of the invention is how the OLAP system obtains data from the heterogeneous data sources at run-time. At run-time, the OLAP system submits a query to a system embodying the invention. The query is then translated, using the stored mapping, and then a resultant query is then submitted to the one or more heterogeneous data sources to obtain the specific data.

Figure 1:
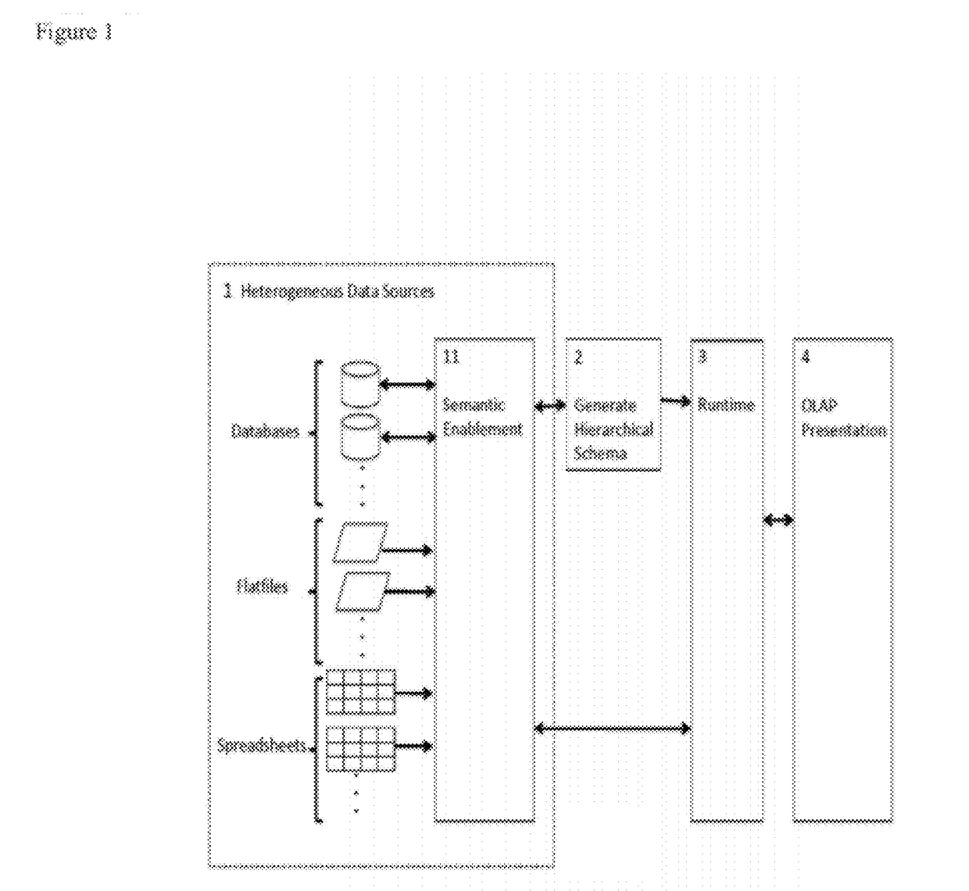
FIG. 1: Architectural diagram of the relation between components of the invention

FIG. 1 shows the relationship between the four basic layers that comprise the invention. Each of these layers will be described in turn.

(1) Semantic Enablement:

In accordance with W3C standards, many forms of data can be transformed and published to the Internet as RDF content. Optionally, meta-data as ontology in RDFS and OWL may also be transformed and published. The object-oriented, inheritance-based architecture of the Semantic Web stack further enables such meta-data to be published as RDF. Methods exist for maintaining web content in relational databases as RDF and standards are emerging for expressing such databases and/or their meta-data as RD, RDFS and OWL, see for example "A survey of current approaches for mapping of relational databases to RDF" http://www.w3.org/2005/Incubator/rdb2rdf/RDB2RDF_SurveyReport.pdf, January 2009. Satya S. Sahoo et. al., and "RDB2RDF working group charter". http://www.w3.org/2009/08/rdb2rdf-charted.html/, September 2009. Similarly, methods exist for spreadsheets and flat files. For example see, with respect to transformation, http://simile.mitedu/repository/RDFizers/flat2rdf/, [Online; accessed 7 Jul. 2010], by Ben Hyde, with respect to spreadsheet transformation, "XLWrap—Spreadsheet-to-RDF Wrapper", http://xlwrap.sourceforge.net/, 2009, [Online; accessed 7 Jul. 2010], by Andreas Langedgger.

These data objects can be incorporated into an arbitrary schema that is compatible with an OLAP representation by use of the invention.

The purpose of the invention is to have these OLAP results accessible over the Internet. For example, a user may search for data using a search engine. The user operates a computer running a browser. The browser may access a search engine website, which receives a text string or other query data. The engine may generate a range of relevant URL's representing addresses where relevant data may be found. Some of the data may be in spreadsheet files, for example Excel compatible files or as flat document files. By using a Semantic Web Stack, all of this related data can be presented to the requesting user. In one embodiment, the search engine creates an OLAP representation that is delivered to the user's browser that the user may manipulate.

(2) Generate Hierarchical OLAP Schema

The Semantic Web stack (RDF/RDFS/OWL) representation forms a graph. Hierarchies are trees, a special kind of graph. It is well known how to create data structures in computer memory that represent a graph. A spanning tree, or spanning forest of a graph is a graph containing the same vertices as the original graph, and a subset of the original graphs edges, such that there are no cycles. In one embodiment, the system uses view definitions to form spanning trees of the RDF graph, in order to enable each such spanning tree to serve as a hierarchical dimension in an OLAP schema. In another embodiment, the system uses data mining methods to identify data hierarchies in databases.

Individual fields are marked if they fulfill the logical requirements to contribute to aggregation and other qualifications to appear as data in the logical equivalent of a fact table in accordance with their indicated hierarchy. One definition of these logical requirements appears in "Summarizability in olap and statistical data bases," Proceedings of the Ninth international Conference on Scientific and Statistical Database Management, 1997 Hans-Joachim Lenz and Arie Shoshani and is incorporated herein by reference.

Figure 2:
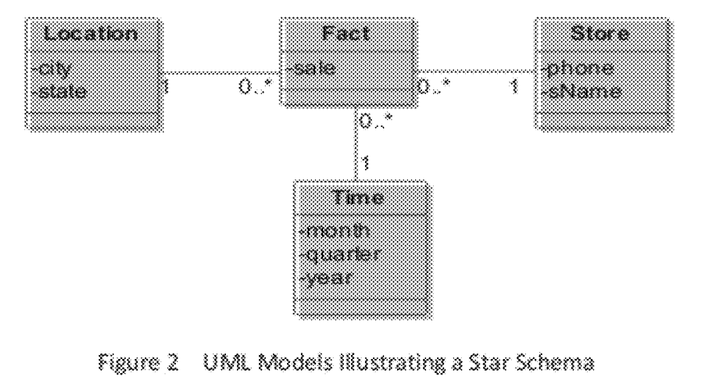
FIG. 2: UML Models Illustrating a Star Schema
Figure 3:
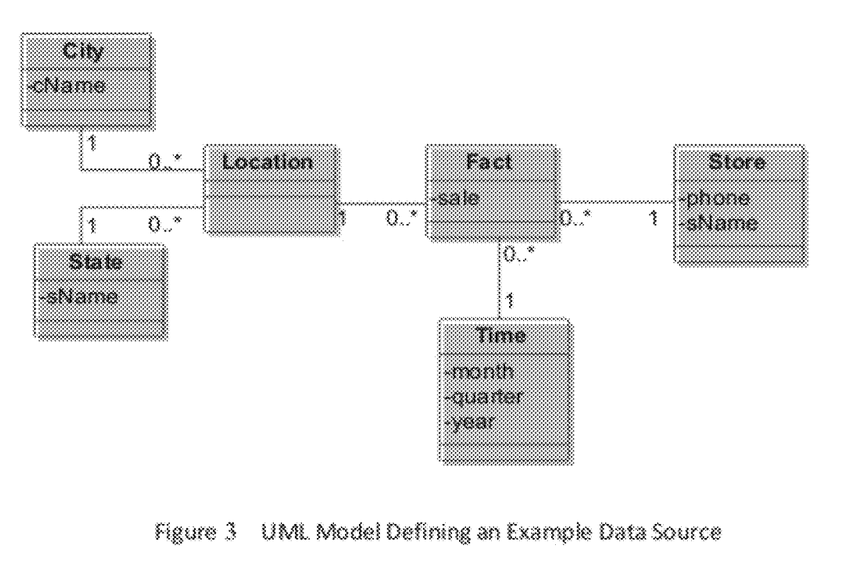
FIG. 3: UML Model Defining an Example Data Source

The invention exploits a prototypical representation of data associated with OLAP systems called a star schema. (FIG. 2). In practice a star schema comprises one or more fact tables, and one or more dimension tables. The attributes of a fact table include the quantitative value under analysis, and a set of foreign-key values. Each foreign-key value associates the fact with a record in a dimension table. The record in the dimension table contains a value for each facet in the hierarchy.

In addition to the relational representation of a star schema, the invention also exploits the direct mapped representation, in accordance with the W3C standard. Reference is made to (http://www.w3.org/TR/rdb-direct-mapping/). A direct mapping represents the schema as OWL and the data as RDF.

Figure 4:
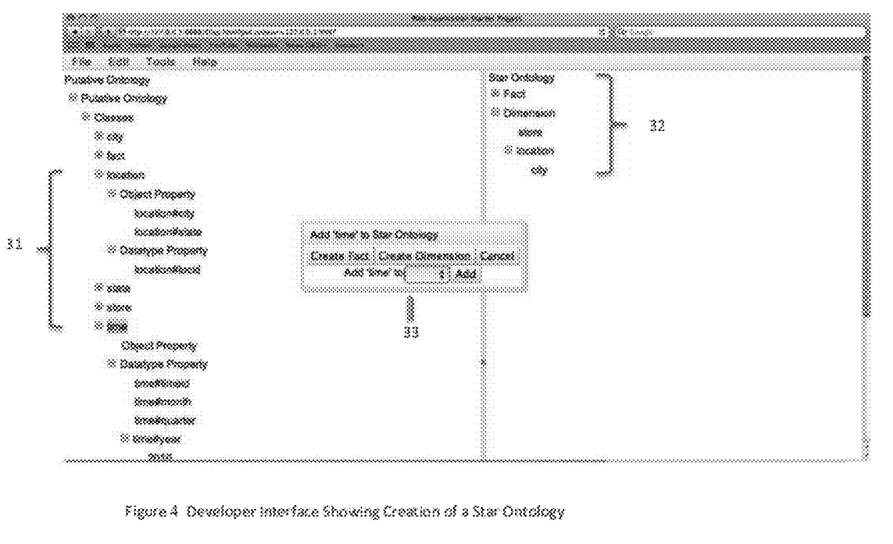
FIG. 4: Developer Interface Showing Creation of a Star Ontology
Figure 5:
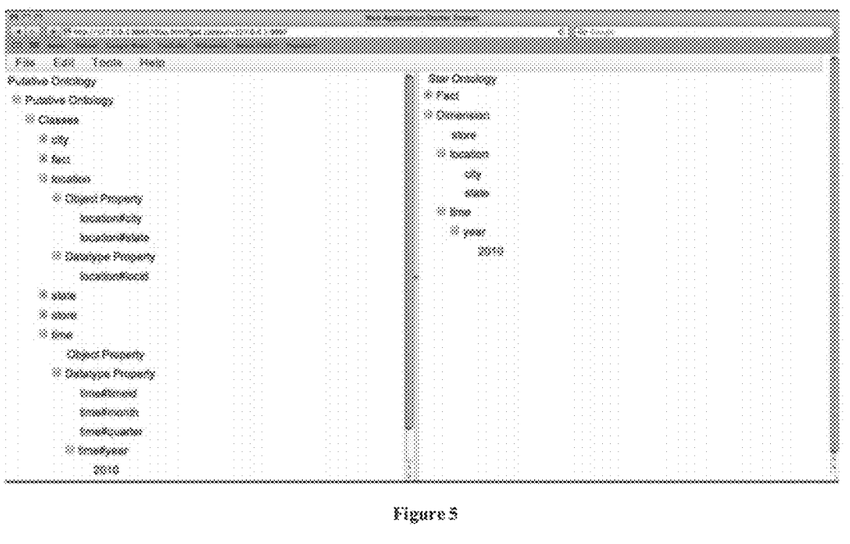
FIG. 5: Developer Interface Showing a Completed Star Ontology
Figure 8:
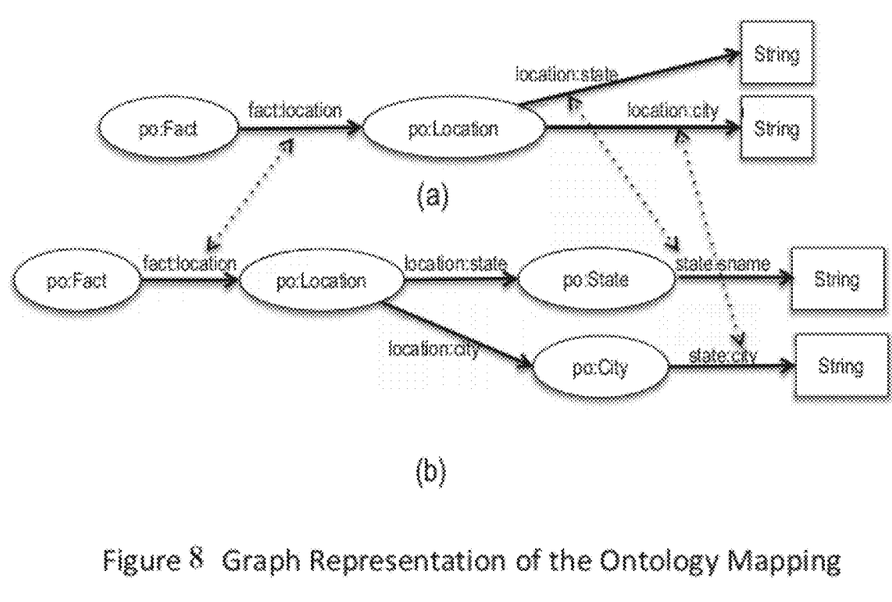
FIG. 8: Graph Representation of the Ontology Mapping

In one embodiment, the developer interface (FIG. 4) displays and modifies three kinds of information, a representation of the structure and content of the semantically enabled data sources (31), the definition of the fact and dimension tables to be computed and rendered by the OLAP interface (32) and the definition of synonyms Other embodiments can capture this information in a different manner or with a different user interface. In particular the OLAP schema may be defined in a separate interface. The definition of synonyms may also be accomplished in a separate interface, Referring to FIG. 4, on the left hand side is a representation of previously chosen, semantica enabled data sources (31). Such data sources are understood to comprise, classes, object properties, data type properties and instances. The right hand side is a workspace where the definitions of the fact and dimension tables are assembled (32). A developer selects an element of the data source and chooses to add it as a fact, dimension or any of their attributes of an existing fact or dimension. The effect is the representation on the left hand side contains building blocks for a representation on the right hand side, such that the representation on the left hand side is a rendering of the structure and content of the data sources, and the representation on the right hand side is a stylized representation of the structure and content of a star schema in semantic form as shown in FIG. 8. In addition, the program logic behind the interface keeps track of the mapping from the source structure, the left hand side, to the star structure, the right hand side. In one implementation this is accomplished by tracking and recording individual steps taken by the developer. Alternatively the structure on the right hand side, once completed, may be compared to the structure on the left hand side using graph or ontology matching methods, and the mapping deduced from the matching components. In either case the mapping is stored as a data structure for future reference.

The labels and data values produced by the data sources may not be rendered as the strings the developer wishes the end user to see. The invention includes the ability for the developer to create a translation dictionary. The invention includes bidirectional translation of source information to end-user representation, and conversely translation of commands from the OLAP interface, using end-user representation, to the corresponding strings and data types needed by the data sources.

In yet another embodiment, a star schema may be created independently and imported and rendered on the right hand side, the mapping of the data sources to the star schema may then be captured through other user interface metaphors such as explicitly drawing connecting lines, or tabular representation of pairings. The star schema template is thereby populated and stored as a data structure.

(3) Run Time

The Run Time module provides a number of translation and bookkeeping services.

The Run Time module enables presentation to the user a choice of data fields and hierarchies to be included in the OLAP presentation. If an OLAP vendor has a flexible system such that their system has graphical interfaces for choosing data fields and hierarchies, these may be reused. In some cases this overlap with screens is intended to support slice and dice operations.

OLAP interface requests for data updates, including new data cubes to be presented to the user, are translated from their native form to a representation integral to the Semantic Web. In addition to the languages previously mentioned, RDF, RDFS and OWL, this may include SPARQL and RIF. These languages are generally known in the field as part of particular W3C standards.

Given the use of standard semantic languages, the Run Time module may query the data sources (1), individually, or in federation, organize the data to be a compatible multidimensional representation and translate it to the native form of representation for the OLAP presentation layer (4). These translation methods may be implemented directly. The translation methods may also be implemented by translating for further processing by existing SQL and OLAP implementations. A method for an implementation that exploits existing database management systems is described below.

In one embodiment, the Run Time module operates on a server and a graphical representation of the OLAP cube is delivered to the user's computer. In that case, as the user operates to manipulate the OLAP cube, for example, drill down, slice, dice and the like, commands from the browser operating on the user's computer are transmitted to the server. The server then modifies the OLAP representation and transmits back to the user a graphical representation of the result.

In another embodiment, the Run Time module operates on the user's computer and the module communicates with the range of data sources comprising the federation. In this case, any manipulation would occur on the user's computer with additional queries to data being transmitted out of the user's computer to the relevant component of the federation of data sources.

In another embodiment, some of the management of the federation of data sources is hosted on a server, while the OLAP cube manipulation occurs on the user's computer. In this embodiment, the user's computer sends commands and requests to the server in a standardized form and the portion of the Run Time module operating on the server then makes the appropriate data query requests to the corresponding members of the federation of data sources.

(4) OLAP Presentation

OLAP systems include the definition of a multidimensional cube, where each dimension is a hierarchy of concepts, a set of quantitative facts, and a navigable user interface capable of operations including slice and dice. Using the interface, a user controls which one of many possible cubes is computed and displayed. The cells of the selected cube contain an aggregation, (e.g. sum or average) of values of the subset of facts that correspond to the chosen hierarchical dimension.

Modern software engineering methods have abstracted the interface components of OLAP systems from the underlying code modules that execute database commands. That is, there is a well-defined interface between the presentation layer and the code modules that execute database commands. This interface often entails MDX (MDX http://msdn.microsoft.com/en-us/library/Aa216767), OLAP query language invented by Microsoft, that acts as a loose, informal, standard for such interfaces. Use of MDX is not required for this invention. Any OLAP vendor's presentation layer can be used, if they have specified an interface between the presentation layer and the underlying code modules. For example, the Mondrian system supports multiple JAVA APIs as well as MDX, though MDX is the primary abstraction segregating the interface. The OLAP presentation layer can be incorporated into an Internet web browsing software application, whether by JAVA native code, JAVA Script or any other means generally known for extending the functionality of a web-browser application, See Mondrian Architecture http://mondrian.pentaho.com/documentation/architecture.php; Mondrian APIs http://mondrian.pentaho.com/api.

Application specific initialization of the interface is executed by the runtime component (3) by deriving information received from the developer interface for example, pre-populated star schema instance. The runtime component (3) provides the translation between the abstraction of the interface, (e.g. MDX), and the semantically enabled data sources. This comprises translating information requests from the interface to a query language. In one embodiment, SPARQL is used by translating the SPARQL query results to the native representation required for the interface.

Figure 6:
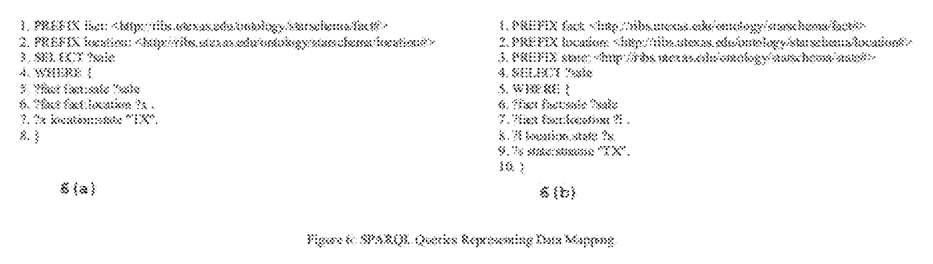
FIG. 6: SPARQL Queries Representing Data Mapping
Figure 7:
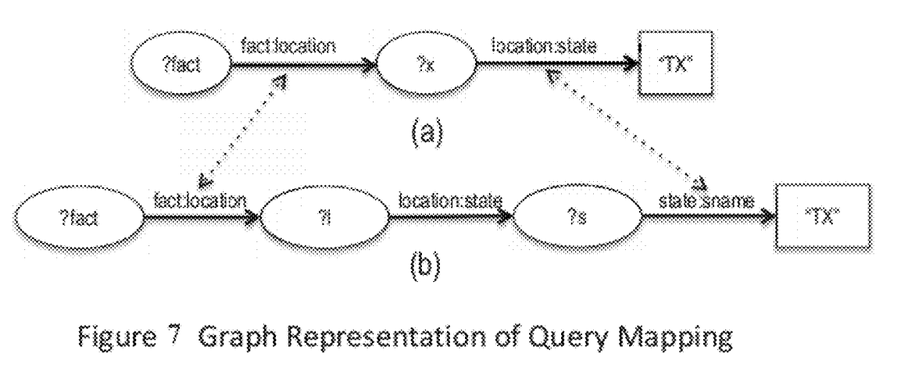
FIG. 7: Graph Representation of Data Mapping

The starting point for these translations is an idealized SPARQL query template that corresponds to executing SPARQL queries on a standard direct mapped version of a star schema. FIG. 6 details such an idealized query that returns all sales in Texas. The pattern in line 5 matches all sales. Lines 6 and 7 match a path through an RDF graph from an individual sale to a node labeled 'TX'. A graphical representation for this pattern appears in FIG. 7. The program logic of the developer interface (FIG. 7) determined that there is a correspondence between the edge labeled fact:location in 7a and the edge by the same label in FIG. 7b. Similarly a correspondence between edge labels location: state of FIG. 7a and state:sname of FIG. 7b. In both representations, there is a path from ?fact to "TX". The runtime system interprets interactions with the user interface based on the star-based representation. Internally, it generates a representation of SPARQL queries in that form. For each pair of patterns typified by lines 6 and 7 of FIG. 6a, it locates the corresponding labels in the graph representation of the semantically enabled data source, computes the corresponding path, forms a pattern for that path and substitutes the pattern definition associated with the star representation with the pattern definition determined for the semantically enabled data source, lines 7, 8 and 9, FIG. 6b.

It is important to note that the SPARQL language is one example of a graph query language representation and that the invention is not specific to SPARQL itself. In addition, RDF is an example of a graph representation of data and the invention is not limited to using the RDF standard itself. Also, OWL is an example of a language that describes ontologies and the invention is not limited to ontologies described using OWL.

It is important to note that while an OLAP system might "send" a query to the system embodying the invention, or the invention might "submit" or "send" a translated query to a database, these acts may occur on the same computer system, which can comprise one or more interconnected CPU's or servers.

In one embodiment, the functions of the run-time and OLAP presentation layer can be combined and executed on a users system. In that case, the semantic mapping data structure is retrieved and used by the user's computer to translate the queries and transmit them to one or more of the heterogeneous data sources. In another embodiment, the OLAP queries are transmitted to one or more servers, who access the mapping data, translate the query and submit the query to one or more of the heterogeneous data sources.

The components of the invention can be executed on a single computer or executed on a collection of computers interconnected with a data network. In yet another embodiment, a browser can present OLAP output as graphics, but have the OLAP processes themselves executed on a server. That server can then perform the translation of the OLAP queries or transmit the OLAP queries to another server that performs the translation.

Operating Environment:

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed method. Further, the customer may receive from and transmit data to the central server by means of the Internet, whereby the customer accesses an account using an Internet web-browser and browser displays an interactive web page operatively connected to the central server. The central server transmits and receives data in response to data and commands transmitted from the browser in response to the customer's actuation of the browser user interface.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that function that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FOR-TRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system on system ROM or fixed disk), or distributed from a server or electronic bulletin board over the communication system (e.g., the Internet or World Wide Web.)

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is no tended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A method of organizing data storage executed by a computer system comprised of one or more computers comprising:

generating a data structure that encodes an ontological representation derived from a database schema stored in the computer system;

extracting from a pre-existing OLAP cube data structure stored in the computer system at least one cube dimension label;

generating a data structure representing a mapping from the ontological representation derived from the database schema to the at least one extracted OLAP cube dimensions;

storing the mapping data structure;

receiving data representing a data search query compatible with the pre-existing OLAP cube data structure; and translating the received query to a data search query compatible with the database from which the ontological representation is derived by using the generated mapping data structure.

2. The method of claim 1 further comprising:
creating and storing a data structure that complies with the generated ontological representation derived from the database schema; and
populating the created data structure so that data elements associated with attributes are allocated to locations in the data structure in accordance with the ontological representation.

3. The method of claim 1 where the step of generating a data structure that encodes an ontological representation is comprised of extracting an ontological representation from a relational database schema.

4. The method of claim 1 where the step of generating a data structure that encodes an ontological representation is comprised of parsing a database schema descriptor file associated with the database.

5. The method of claim 4 where the descriptor file is a SQL ddl file.

6. The method of claim 1 where the database is a relational database.

7. The method of claim 1 where the step of generating a data structure that encodes an ontological representation is comprised of receiving data representing the result of parsing a database schema descriptor file.

8. The method of claim 1 where the step of extracting at least one cube dimension label is further comprised of parsing an OLAP cube definition file associated with the pre-existing OLAP cube data structure.

9. The method of claim 8 where the OLAP cube definition file is a data structure representing a hierarchy of labels.

10. The method of claim 1 where the step of generating a mapping data structure is further comprised of encoding a hierarchy of labels associated with the pre-existing OLAP cube.

11. The method of claim 1 where the generating a mapping data structure step is further comprised of generating a data structure that represents a graph.

12. The method of claim 11 where the generated mapping data structure encodes the graph in the form of a matrix, where the values in the matrix represent the edges of the graph, said edges being connections between one or more vertices in the graph.

13. The method of claim 11 where the generated mapping data structure encodes the graph in the form of a list of edges of the graph, said edges being connections between one or more vertices in the graph.

14. The method of claim 11 where the generated mapping data structure encodes the graph in the form of a set based data structure, where each member of the set is a pair of elements, the first element corresponding to a first vertex in the graph and the second element a list of at least one edges that connect the first vertex to at least one second vertex.

15. The method of claim 1 where the generating a mapping data structure step is further comprised of generating a spanning tree.

16. A non-transitory computer readable medium comprising encoded program code that when executed by a computer system causes the computer system to execute any of the methods of claims 2, 3-15.

17. A method of accessing data stored on a computer system executed by one or more computers comprising:
receiving data representing a first data search query compatible with an OLAP system; and
automatically translating the received first query into a second data search query compatible with a database by using a data structure that encodes an ontological representation derived from the schema associated with the database.

18. The method of claim 17 further comprising:
submitting the translated second data search query to a database system that utilizes the database schema.

19. A method of accessing data on a first relational database executed by one or more computers comprising:
generating a data structure that defines an OLAP definition of an OLAP cube by using a populated ontological template comprised of at least one attribute, said template derived from a schema of the first relational database that is comprised of the at least one attribute;
storing the data structure in computer memory
receiving data representing a data search query compatible with the pre-existing OLAP cube data structure; and
translating the received query to a data search query compatible with the database from which the ontological representation is derived by using the populated template.

20. A non-transitory computer readable medium comprising encoded program code that when executed by a computer system causes the computer system to execute any of the methods of claims 1, 17, 18, 19.

21. A computer system comprised of a data memory comprising:
a data processing module adapted to generate a data structure stored in the data memory that encodes an ontological representation derived from a database schema stored in a computer system said schema associated with a database;
a data processing module adapted by logic to generate in the data memory a data structure that represents a mapping from the ontological representation derived from the stored database schema to at least one of the dimensions of an OLAP cube data structure;
a data processing module adapted by logic to receive data representing a first data search query compatible with the OLAP cube data structure; and
a data processing module adapted by logic to translate the received first data search query to a second data search query compatible with the database associated with the database schema by using the mapping data structure.

22. The system of claim 21 where the generating module is further adapted by logic to parse a descriptor file associated with the database schema.

23. The system of claim 22 where the descriptor file is a SQL ddl file.

24. The system of claim 21 further comprising:
a module adapted by logic to parse a definition file associated with the OLAP cube data structure.

25. The system of claim 21 where the database schema is a relational database schema.

26. The system of claim 21 further comprising a relational database where the database schema is the schema associated with the relational database.

27. The system of claim 21 where the where the generating module is further adapted by logic to extract at least one cube dimension label from a pre-existing OLAP cube data structure.

28. The system of claim 21 where the generating module is further adapted by logic to create and store a data structure that represents a graph where said graph encodes the generated mapping.

29. A computer system comprised of a data memory comprising:

a module adapted by logic to receive data representing a first data search query compatible with an OLAP data source;

a data processing module adapted by logic to automatically generate a data structure stored in the data memory that encodes an ontological representation derived from a database schema stored in the computer system that is associated with a database; and a data processing module adapted by logic to automatically translate the received first query into a second data search query by using the generated data structure derived from the database schema associated with the database.

30. The system of claim 29 further comprising:

the database associated with the database schema; and a data processing module adapted by logic to submit the translated second data search query to the database.

31. The system of claim 30 further comprising:

a data processing module adapted by logic to map the ontological representation derived from the stored database schema to at least one of the dimensions of the OLAP cube data source using the output of the module adapted by logic to automatically generate the data structure.

* * * * *